June 17, 1958

E. JORGENSEN 2,839,247

MIXING VALVES

Filed March 5, 1956

3 Sheets-Sheet 1

Inventor
E. Jorgensen
By Attys

June 17, 1958 E. JORGENSEN 2,839,247
MIXING VALVES
Filed March 5, 1956 3 Sheets-Sheet 3
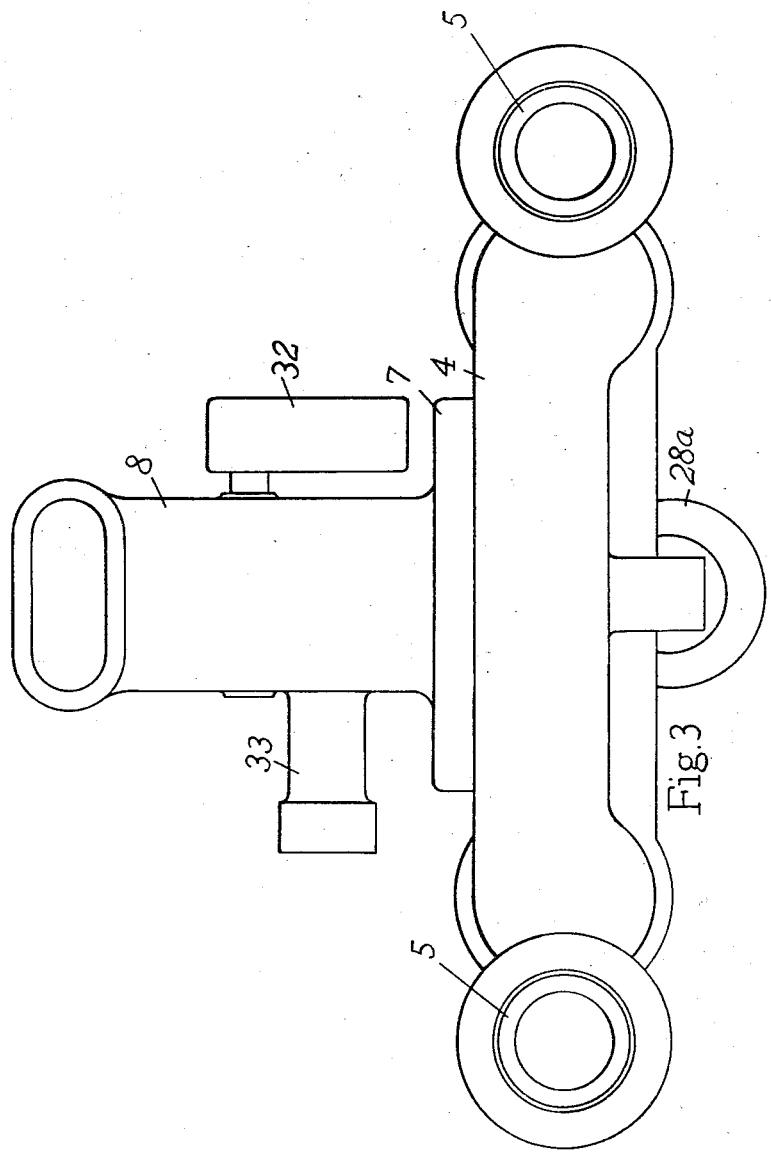
Inventor
E. Jorgensen
By Hascock Downing Seebold
Attys

United States Patent Office 2,839,247
Patented June 17, 1958

2,839,247

MIXING VALVES

Emanuel Jorgensen, Sunicroft, Dudley, England

Application March 5, 1956, Serial No. 569,536

Claims priority, application Great Britain March 21, 1955

1 Claim. (Cl. 236—12)

This invention relates to a mixing valve for hot and cold liquids of the kind, whereby the liquid flow from a source of hot liquid and from a source of cold liquid to a common outlet are automatically proportioned to maintain the liquid flowing through the outlet at a substantially constant predetermined temperature.

The object of the invention is to provide such a mixing valve in an efficient and convenient form.

According to the invention a mixing valve for hot and cold liquids of the kind specified comprises in combination a hollow body part defining a mixing chamber having an outlet and a pair of opposed inlets for hot and cold liquids respectively, a pair of flap valves in the mixing chamber respectively for controlling the flow from the pair of inlets, a thermally sensitive element mounted in the mixing chamber between the pair of flap valves in a position to act on either valve, and means operable from the exterior of the body part for determining the setting of the thermally sensitive element.

The invention may further comprise the combination with a mixing valve according to the preceding paragraph of a main valve associated with each inlet, hydraulic means for opening each main valve, and a manually operable valve for controlling the admission of liquid from one of the sources to both hydraulic means.

Figure 1:
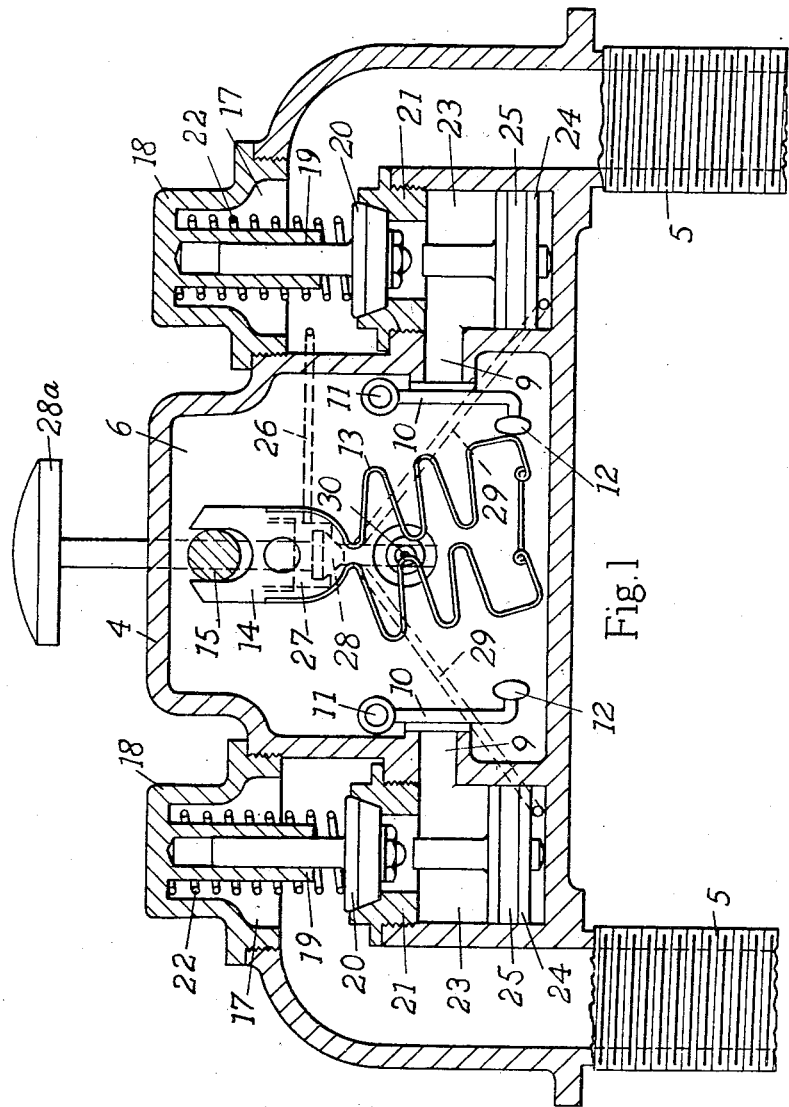
Figure 2:
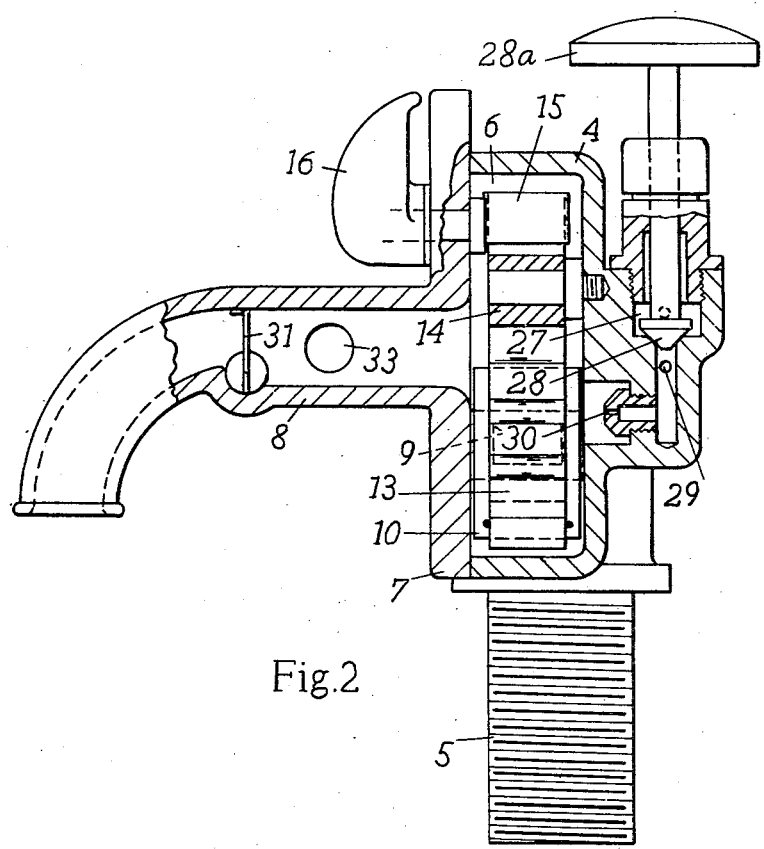

By way of example an embodiment of the invention will be described with reference to the accompanying drawings as applied to a mixing valve for use in supplying water to a domestic bath, wash basin, sink or the like, though it will be appreciated that the valve may have other applications. In the accompanying drawings Figures 1 and 2 are sectional front and side views respectively, and Figure 3 is an inverted plan. The body part 4 is formed as a hollow casting having a vertically arranged integral pipe connection 5 at each side adapted respectively for connection to the domestic hot and cold water supplies. At the middle of the body part 4 is defined a mixing chamber 6 the front of which is constituted by a detachable part 7 in which is formed a tubular outlet 8. In the side walls of the mixing chamber 6 at opposite points are formed a pair of inlets 9 with each of which co-operates one of a pair of flap valves 10 which is pivoted at its upper end on a pin 11 within the mixing chamber. These flap valves, which have facings of rubber or like material, tend to close under the action of gravity and thereby act as non-return valves in preventing flow from the mixing chamber 6 to the inlets 9. Also the flap valves have cranked portions extending below the inlets, the extremities of these portions being directed towards one another, and having heads 12 with convex faces on their sides presented to one another.

Within the mixing chamber and between the flap valves is mounted a thermally sensitive element 13 which conveniently consists of a pair of bi-metal strips rigidly connected to a rocker 14 at their upper ends, and linked together at their lower ends. These strips may each incorporate a series of bends or folds, and the high expansion sides of the two strips are arranged so that their lower ends move in the same direction in response to temperature changes. Also the arrangement is such that, in response to a predetermined rise in temperature, the lower end of the element moves towards the flap valve 10 controlling the hot water inlet, and by bearing against the convex face of its head 12 moves it in a direction to reduce the flow of hot water to the mixing chamber. Conversely in response to a fall in temperature the lower end of the element 13 moves to reduce the flow through the flap valve 10 controlling the admission of cold water.

The rocker 14 is pivotally mounted in the mixing chamber and has a slot in one limb in which is engaged an eccentric 15 formed or mounted on a spindle projecting through the detachable part 7. This spindle carries a handle 16 whereby the eccentric 15 can be rotated to move the rocker 14 and thereby adjust the setting of the element 13 to accord with a desired temperature to be maintained.

At the sides of the mixing chamber there are formed in the body part a pair of similar valve chambers 17 which are in communication respectively with the two aforementioned pipe connections 5. Each of these valve chambers is closed at its upper end by a screw cap 18 engaging a screw-threaded hole in the top of the body part 4 and on the underside of each cap 18 is formed a tubular guideway 19 for the stem of a main valve member 20. Each main valve member has an inverted truncated conical head at its lower end, which is provided with a rubber or rubber-like peripheral facing adapted to engage a complementary seating formed in an annular member 21 having an external screw-thread engaging within a hole in the body part 4 at the bottom of the valve chamber. A spring 22 interposed between the cap and the head of the valve member serves to urge the valve member against its seating, assisted by the water pressure at the source to which the associated pipe connections 5 are connected.

Each of the members 21 is located at the upper end of a cylinder 23 formed in the body part, and within each of these cylinders is a piston 24 having a rubber or rubber-like piston ring 25. Each piston has an upwardly directed stem which, when the piston is moved upwardly, engages the associated main valve member 20 to lift it from its seating and thereby admit water to the upper end of the cylinder 23 and thence through the associated inlet 9 to the mixing chamber 6. One of the main valve chambers, preferably that connected to the cold water supply, is in communication through a small passage 26 formed in the body part, with the chamber 27 of a manually operable valve situated at the rear of the mixing chamber. This valve comprises a conical valve member 28 which can be moved vertically in the chamber 27 from an associated seating by screw means actuated by a handle 28a projecting from the top of the body part. When this manually operable valve is opened the passage in the body part is placed in communication with two further passages 29 in the body part and connected respectively to the lower ends of the two cylinders 23 below the pistons 24. These passages 29 are also in communication with the mixing chamber 6 through a small vent jet 30.

In operation when it is desired to supply water at a selected temperature to the outlet 8 after setting the rocker by the external handle 16 it is only necessary to open the manually operable valve 28. Opening of this valve admits water under pressure to both cylinders 23 below the piston. By virtue of the fact that the area of each piston 24 is greater than the area of its associated main valve member 20 the pistons in rising open the main valves and admit water from both sources to their respective inlets 9 to the mixing chamber. According to the presetting of the rocker 14 the thermally sensitive element 13 will, by its action on the two flap valves 10 control and proportion the admission of water to maintain the water in the mixing chamber 6 and therefore the outlet 3 substantially constant at the preset temperature. This preset temperature may vary between the temperature of the cold water supply and that of the hot water supply.

When the manually operable valve member 28 is closed on its seating, the water trapped within the cylinders 23 below the piston can leak through the vent jet 30 to the mixing chamber thus permitting the main valves to close under the action of their springs 22 and assisted by the water pressure at their respective sources of supply.

If desired there may be provided in the tubular outlet 3 a butterfly or other valve 31 operable by an external control lever 32 to divert water flowing through the outlet to a lateral port 33 adapted for the connection thereto of a spray tube.

By detaching the front part 7 of the mixing chamber access can be gained to the flap valves 10 and the thermally sensitive element 13 for maintenance purposes, without the necessity of turning off the main water supplies, provided that the manually operable valve is closed. Also, after turning off a main supply, by removing the screw cap 18 the associated main valve member 20 can be withdrawn from the body part. Further, the associated seating 21 can then be unscrewed and removed from the body part and subsequently the piston 24 also can be withdrawn.

Having thus described my invention what I claim as new and desire to secure by Letters Patent is:

A mixing valve mechanism for hot and cold liquids, comprising in combination a hollow body part defining a mixing chamber provided with a pair of inlets for the hot and cold liquids respectively, and with a liquid outlet, a pair of flap valves freely pivoted in the mixing chamber to co-operate respectively with the inlets for permitting liquid flow into the mixing chamber through the inlets whilst preventing return flow of liquid from the mixing chamber to the inlets, a thermally sensitive element mounted in the mixing chamber between the flap valves in a position from which it is movable by thermal deformation to bear against and move the valves alternatively for varying the proportional flows of hot and cold liquids into the mixing chamber through the inlets, means operable from the exterior of the body part for varying the setting of the thermally sensitive element depending on the temperature at which liquid is required to flow from the mixing chamber through the outlet, a pair of main valves for controlling the supply of the hot and cold liquids to the corresponding inlets, hydraulically operable devices for actuating the main valves, chambers in which the main valves are arranged and through which the hot and cold liquids can be supplied to the corresponding inlets, passage means connecting the hydraulically operable devices to the valve chamber through which cold liquid is supplied to the corresponding inlet, and from which cold liquid has access through the passage means to the hydraulically operable devices for operating the latter, and a manually operable valve for controlling the flow of cold liquid through the passage means.

References Cited in the file of this patent

UNITED STATES PATENTS

| | | |
|---|---|---|
| 1,024,729 | Lawler | Apr. 30, 1912 |
| 2,211,481 | Scott | Aug. 13, 1940 |
| 2,216,346 | Hedmark | Oct. 1, 1940 |
| 2,269,259 | Fields | Jan. 6, 1942 |
| 2,463,640 | Plett | Mar. 8, 1949 |
| 2,484,180 | McConnell | Oct. 11, 1949 |
| 2,565,425 | Hamill | Aug. 21, 1951 |